US009365198B2

(12) United States Patent
Masuda et al.

(10) Patent No.: US 9,365,198 B2
(45) Date of Patent: Jun. 14, 2016

(54) BRAKING DEVICE FOR VEHICLE

(71) Applicants: ADVICS CO., LTD., Kariya (JP); TOYOTA JIDOSHA KABUSHIKI KAISHA, Toyota (JP)

(72) Inventors: Yoshio Masuda, Kariya (JP); Yasunori Sakata, Toyota (JP); Kazutaka Noro, Kariya (JP); Akira Sakai, Toyota (JP); Kiyoyuki Uchida, Konan (JP); Masaaki Komazawa, Miyoshi (JP); Yasuji Mizutani, Toyota (JP); Yusuke Kamiya, Okazaki (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/380,627

(22) PCT Filed: Mar. 21, 2013

(86) PCT No.: PCT/JP2013/058156
§ 371 (c)(1),
(2) Date: Aug. 22, 2014

(87) PCT Pub. No.: WO2013/141324
PCT Pub. Date: Sep. 26, 2013

(65) Prior Publication Data
US 2015/0015061 A1  Jan. 15, 2015

(30) Foreign Application Priority Data
Mar. 21, 2012  (JP) .................................. 2012-064515

(51) Int. Cl.
*B60T 13/16* (2006.01)
*B60T 13/68* (2006.01)
(Continued)

(52) U.S. Cl.
CPC ............. *B60T 13/686* (2013.01); *B60T 8/3265* (2013.01); *B60T 8/4077* (2013.01); *B60T 13/142* (2013.01);
(Continued)

(58) Field of Classification Search
CPC ....... B60T 8/17; B60T 13/143; B60T 13/662; B60T 13/686; B60T 8/3265; B60T 8/4077; B60T 13/146; B60T 13/142; B60T 13/147; B60T 8/3655; B60T 8/4081; B60T 8/4013; B60T 13/14
USPC .............................................. 303/10, 116.1, 3
See application file for complete search history.

(56) References Cited

U.S. PATENT DOCUMENTS

| | | | |
|---|---|---|---|
| 2006/0158032 | A1 | 7/2006 | Miyazaki et al. |
| 2006/0209486 | A1 | 9/2006 | Fey et al. |

(Continued)

FOREIGN PATENT DOCUMENTS

| | | | |
|---|---|---|---|
| JP | 11-165632 | A | 6/1999 |
| JP | 2004-237982 | A | 8/2004 |

(Continued)

OTHER PUBLICATIONS

International Search Report (PCT/ISA/210) mailed on May 14, 2013, by the Japanese Patent Office as the International Searching Authority for International Application No. PCT/JP2013/058156.

*Primary Examiner* — Thomas J Williams
*Assistant Examiner* — Mariano Sy
(74) *Attorney, Agent, or Firm* — Buchanan Ingersoll & Rooney PC

(57) ABSTRACT

A braking device for a vehicle includes an operating characteristics setting portion for setting an operating characteristic which is a relationship between the input electric power to the electro-magnetic valve and a pressure difference between a master cylinder side and a wheel cylinder side with respect to the electro-magnetic valve, based on the input electric power at the time when the accumulator pressure detected by the accumulator pressure detecting portion first falls to a value equal to or less than a threshold value accumulator pressure by changing the input electric power towards an opening side of the electro-magnetic valve in response to a time lapsed after a predetermined value of the pilot pressure has been generated by the pilot pressure generating portion by first closing the electro-magnetic valve thereby to suppress the manufacturing cost.

4 Claims, 6 Drawing Sheets

(51) Int. Cl.
  *B60T 13/14*  (2006.01)
  *B60T 13/66*  (2006.01)
  *B60T 8/32*   (2006.01)
  B60T 8/40    (2006.01)
  B60T 8/36    (2006.01)

(52) U.S. Cl.
  CPC ............ B60T 13/143 (2013.01); B60T 13/146 (2013.01); B60T 13/147 (2013.01); B60T 13/662 (2013.01); *B60T 8/3655* (2013.01); *B60T 8/4081* (2013.01)

(56) References Cited

U.S. PATENT DOCUMENTS

| | | | |
|---|---|---|---|
| 2011/0285199 A1* | 11/2011 | Ishida | B60T 7/042 303/3 |
| 2013/0057054 A1* | 3/2013 | Ishida | B60T 7/042 303/3 |
| 2013/0127238 A1* | 5/2013 | Masuda | B60T 13/142 303/6.01 |
| 2013/0127240 A1* | 5/2013 | Noro | B60T 13/58 303/14 |
| 2013/0127241 A1* | 5/2013 | Sakata | B60T 13/58 303/14 |
| 2013/0221736 A1 | 8/2013 | Kuki et al. | |
| 2014/0008967 A1* | 1/2014 | Takeuchi | B60T 13/161 303/155 |
| 2015/0035351 A1* | 2/2015 | Okano | B60T 8/48 303/10 |
| 2015/0107240 A1* | 4/2015 | Masuda | B60T 8/36 60/537 |
| 2015/0151729 A1* | 6/2015 | Yamasoe | B60T 7/042 303/122.03 |
| 2015/0203088 A1* | 7/2015 | Kuki | B60T 8/17 303/119.1 |
| 2015/0251643 A1* | 9/2015 | Isono | B60T 7/042 60/588 |

FOREIGN PATENT DOCUMENTS

| | | | |
|---|---|---|---|
| JP | 2006-199133 A | 8/2006 | |
| JP | 2008-087617 A | 4/2008 | |
| JP | 2011-157071 A | 8/2011 | |

* cited by examiner

Cylinder opening side ⟵⟶ Cylinder bottom side

BRAKING DEVICE FOR VEHICLE

TECHNICAL FIELD

This invention relates to a braking device for a vehicle which applies braking force to the vehicle in response to an amount of braking operation by an operator of the vehicle.

BACKGROUND ART

As an example, a braking device for a vehicle which applies braking force to the vehicle in response to the amount of braking operation by an operator of the vehicle is disclosed in a Japanese patent publication JP2008-87617 A (patent document 1). The braking device in the document is, for example, equipped with a master cylinder which supplies wheel cylinders with braking fluid. An electro-magnetic valve is provided in the hydraulic passage hydraulically connecting the master cylinder with the wheel cylinders. The electro-magnetic valve is of a type which controls flow of braking fluid in response to an electric power to be supplied thereto. A method for setting the operating characteristics of the electro-magnetic valve (such as a relationship between the valve opening current/valve opening electric power and the pressure difference) is disclosed in, for example, a patent publication JP2004-237982 A (patent document 2). According to this method, the operating characteristics of the electro-magnetic valve are determined by directly measuring the pressure at the upstream and downstream sides of the electro-magnetic valve.

CITATION LIST

Patent Document

Patent Document 1: JP2008-87617 A
Patent document 2: JP2004-237982 A

SUMMARY OF INVENTION

Technical Problem

According to the method for determining the operating characteristics of the electro-magnetic valve disclosed in the Patent Document 1, it is necessary to provide a pressure sensor on at least one side of the upstream side and the downstream side of the electro-magnetic valve in order to directly measure the pressure therein. This may lead to an increase of manufacturing cost due to an added provision of the sensor.

Accordingly, this invention was made in consideration with the above-mentioned situation and the objective of the invention is to provide a braking device for a vehicle which can set the operating characteristics of the electro-magnetic valve without increasing the manufacturing cost.

Solution to Problem

The braking device for a vehicle according to the invention associated with a first aspect includes a hydraulic pressure generating device which generates a master pressure in a master chamber by driving a master piston by a driving pressure in a driving chamber, a wheel cylinder connected to the master chamber and an electro-magnetic valve for controlling a braking fluid flow between the hydraulic pressure generating device and the wheel cylinder in response to an input electric power. The braking device further includes a high pressure source formed by a pump and an accumulator for accumulating the braking fluid discharged from the pump, a pilot pressure generating portion for generating a desired pilot pressure, a mechanical type regulator connected to the accumulator, the pilot pressure generating portion and the driving chamber for generating a hydraulic pressure in the driving chamber in response to the pilot pressure based on an accumulator pressure in the accumulator, an accumulator pressure detecting portion for detecting the accumulator pressure and an operating characteristics setting means for setting an operating characteristic which is a relationship between the input electric power to the electro-magnetic valve and a pressure difference between a master cylinder side and a wheel cylinder side with respect to the electro-magnetic valve, based on the input electric power at the time when the accumulator pressure detected by the accumulator pressure detecting portion first falls to a value equal to or less than a threshold value accumulator pressure by changing the input electric power towards an opening side of the electro-magnetic valve in response to a time lapsed after a predetermined value of the pilot pressure has been generated by the pilot pressure generating portion by first closing the electro-magnetic valve.

The braking device according to a second aspect of the invention is characterized in that in addition to the feature of the above first aspect, the braking device further includes a driving pressure detecting portion for detecting the driving pressure of the driving chamber and that the operating characteristics setting means sets the operating characteristic based on the input electric power at the time when the accumulator pressure first falls to equal to or less than the threshold value accumulator pressure after the driving pressure detected by the driving pressure detecting portion falls to equal to or less than a predetermined threshold driving pressure.

The braking device according to a third aspect of the invention is characterized in that in addition to the feature of the above first or the second aspect, the operating characteristics setting means initiates setting of the operating characteristic of the electro-magnetic valve after the accumulator pressure has been set to be equal to or more than a predetermined accumulator setting pressure based by controlling the high pressure source.

The braking device according to a fourth aspect of the invention is characterized in that in addition to any feature of the above first, second or third aspect, the operating characteristics setting means initiates setting of the operating characteristic of the electro-magnetic valve after a predetermined time passed after the accumulator pressure had been increased by controlling the high pressure source.

Advantageous Effects of Invention

According to the braking device for the vehicle having the wheel cylinder, the electro-magnetic valve, the high pressure source, the pilot pressure generating portion and the mechanical type regulator recited in the first aspect of the invention, when the master piston is moved in response to the opening operation of the electro-magnetic valve, the braking fluid in the accumulator is consumed so that the driving pressure is kept to be the hydraulic pressure corresponding to the pilot pressure. Thus, the accumulator pressure in the accumulator is decreased due to the consumption of the braking fluid therein. The inventors of this application focused on this fact and the braking device for a vehicle according to the invention associated with the first aspect is devised to have the operating characteristics of the electro-magnetic valve set utilizing the accumulator pressure. Therefore, without adding additional sensors, the operating characteristics of the electro-magnetic valve can be set. Comparing to the device of the prior art, no pressure sensor is needed which directly measures the pressure at both upper and lower sides of the electro-magnetic valve. This can enable the reduction in manufacturing cost.

The accumulator pressure may vary in response to the changes of the temperature other than the discharge of braking fluid by the pump. Further, according to the braking device for a vehicle explained above, the driving pressure drops temporarily before the drop of the accumulator pressure in response to the opening of the electro-magnetic valve. Accordingly, the inventors of the present invention focused on this fact and the braking device for a vehicle according to the invention associated with the second aspect is devised to detect a pressure drop of the accumulator pressure only after the detection of the drop of the driving pressure. Thus, an erroneous detection of the drop of the accumulator which may be caused by the temperature changes or the like, other than the drop of the accumulator pressure in response to the opening of the electro-magnetic valve, can be minimized or suppressed, thereby to improve accuracy of setting of the operating characteristics.

It is noted here that the fact that the change amount of the accumulator pressure relative to the change amount of the accumulated fluid amount increases, when the accumulator pressure increases, is known. The braking device according to the invention associated with the third aspect is devised to initiate the setting of the operating characteristics of the electro-magnetic valve by setting the accumulator pressure higher than a predetermined set pressure. Accordingly, a larger pressure change can be obtained by a smaller change of accumulated fluid amount. Thus, the operating characteristics can be accurately set.

Still further, it is noted that the accumulator pressure varies in response to the change of the temperature of the accumulator after the accumulator pressure has been increased. The braking device for a vehicle according to the invention associated with the fourth aspect is devised to initiate the setting of operating characteristics of the electro-magnetic valve after a predetermined time elapsed after the accumulator pressure was increased. Thus, by setting the starting time of operating characteristics setting of the electro-magnetic valve after the change of the accumulator pressure due to the temperature change, an erroneous detection of the accumulator pressure drop caused by the temperature change can be prevented or minimized and correct detection of the accumulator pressure drop caused by the opening of the electro-magnetic valve can be enhanced to improve the setting operation of the operating characteristics of the electro-magnetic valve.

EMBODIMENTS OF THE INVENTION

Some embodiments of the present invention will be explained below with reference to the attached drawings. It is noted here that each Figure indicates the concept of the embodiment and does not actually define the detail sizes or the dimensions of the structure.

Figure 1:
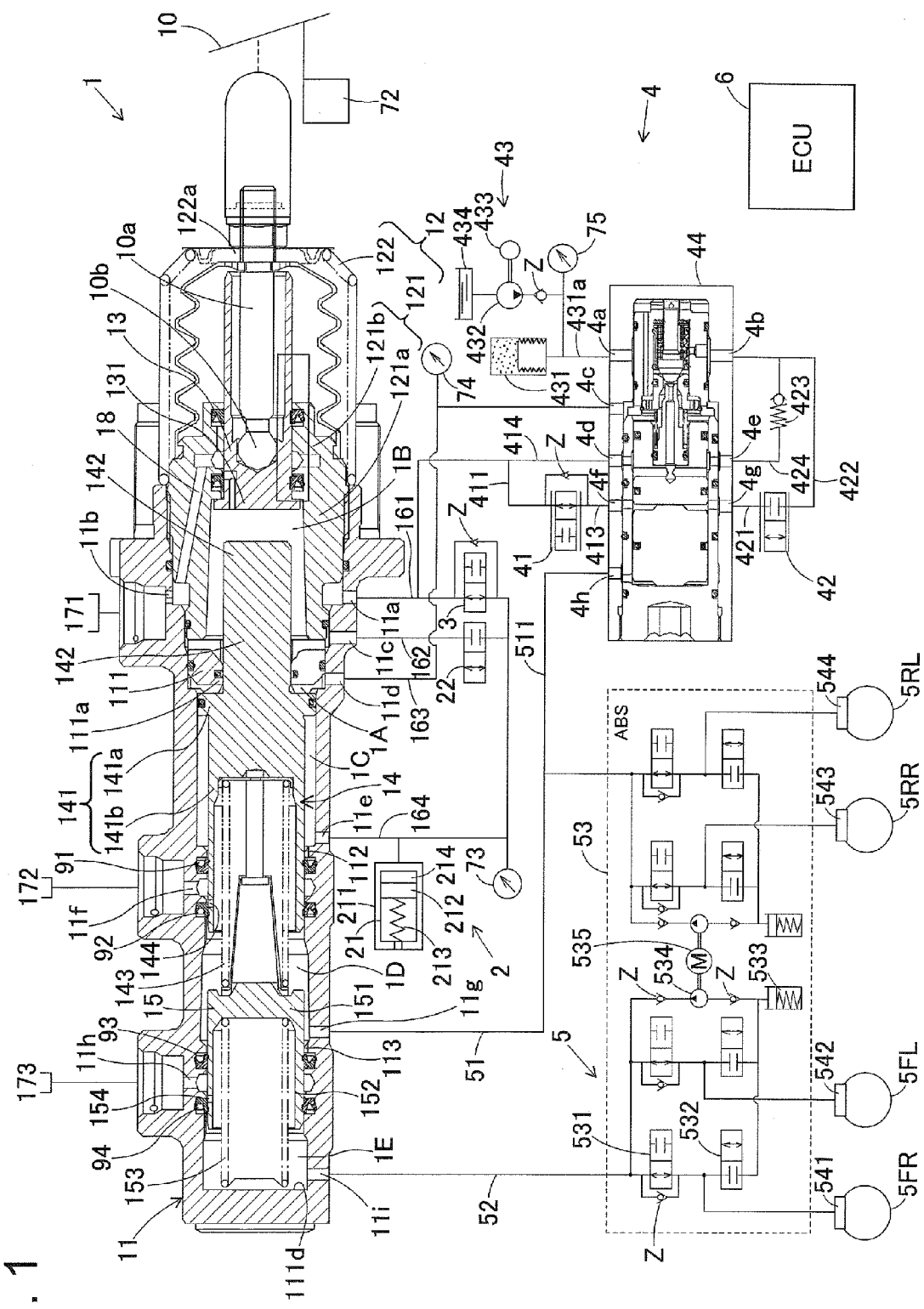
FIG. 1 is a partial sectional-explanatory view illustrating a configuration of a braking device for a vehicle according to an embodiment.

As illustrated in FIG. 1, the braking device for a vehicle includes, as the main part, a master cylinder 1, a reaction force generating device 2, a separation lock valve 22, a reaction force valve 3, a servo pressure generating device (corresponding to the hydraulic pressure generating device) 4, a braking apparatus 5, a brake ECU 6 and various type sensors 72 to 75 communicable with the brake ECU. In this embodiment, a well-known hybrid ECU (not shown) is to be connected to the brake ECU 6.

(Explanation of the Master Cylinder 1)

The master cylinder 1 supplies the braking apparatus 5 with the braking fluid and is formed mainly by a main cylinder 11, a cover cylinder 12, an input piston 13, a first master piston 14 and a second master piston 15.

The main cylinder 11 is formed in a substantially bottomed cylinder shape having an opening at one end thereof and a bottom surface at the other end. Hereinafter, the master cylinder 1 will be explained while defining the opening side of the main cylinder 11 as a rear and the bottom surface side (a closed side) thereof as a front. The main cylinder 11 includes therein an inner wall portion 111, which separates the opening side (the rear side) and the bottom surface side (the front side) of the main cylinder 11. An inner circumferential surface of the inner wall portion 111 is provided with a through hole 111a at a central portion thereof which penetrates the cylinder through in an axial direction (in a front-rear direction).

The main cylinder 11 includes therein a small diameter portion 112 (front) and a small diameter portion 113 (rear), at which an inner diameter of the main cylinder 11 is smaller than the rest, at locations forwardly of the inner wall portion 111. In other words, the small diameter portions 112, 113 project from the entire inner circumferential surface of a portion of the main cylinder 11 in an axial direction. The below-mentioned master pistons 14, 15 are provided inside the main cylinder 11 while allowing the master pistons 14, 15 to be slidably movable in the axial direction. Ports and the like which interconnect the inside and outside of the main cylinder 11 will be described below.

The cover cylinder 12 includes a cylinder portion 121 in a substantially cylinder shape and a cup-shaped cover portion 122. The cylinder portion 121 is arranged at a rear end of the main cylinder 11 and is coaxially fitted into the opening of the main cylinder 11. An inner diameter of a front portion 121a of the cylinder portion 121 is formed to be greater than an inner diameter of a rear portion 121b thereof. Furthermore, the inner diameter of the front portion 121a is formed to be greater than an inner diameter of the through hole 111a of the inner wall portion 111.

The cover portion 122 is attached to the rear end portion of the main cylinder 11 and an outer circumferential surface of the cylinder portion 121 so as to cover the opening of the main cylinder 11 and a rear end opening of the cylinder portion 121. A through hole 122a is formed at a bottom wall of the cover portion 122. The cover portion 122 is made of an elastic material expandable and contractible in the axial direction and the bottom wall thereof is biased in a rearward direction.

The input piston 13 is configured to slidably move inside the cover cylinder 12 in response to an operation of a brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than other parts of the input piston 13. The input piston 13 is arranged so that the bottom wall 131 is positioned at a rear end of the inside of the front portion 121a formed at the cylinder portion 121. Furthermore, the input piston 13 is fluid-tightly provided inside the rear portion 121b of the cylinder portion 121 while allowing the input piston 13 to be slidably movable in the axial direction.

An operation rod 10a of the brake pedal 10 is inserted into the input piston 13 from a rear end thereof to the front. The operation rod 10a and the input piston 13 are connected with one another by a pivot 10b, which is formed at an end portion (a front end portion) of the operation rod 10a. The operation rod 10a projects towards the outside through the opening of the input piston 13 and the through hole 122a of the cover portion 122, and is connected to the brake pedal 10. The operation rod 10a moves in response to the operation to the brake pedal 10. More specifically, when the brake pedal 10 is pressed, the operation rod 10a advances in a forward direction while pressing the cover portion 122 in the axial direction. The input piston 13 also advances in response to the forward movement of the operation rod 10a.

The first master piston 14 is arranged within the main cylinder 11, while allowing the first master piston 14 to be slidably movable in the axial direction. More specifically, the first master piston 14 includes a first main body portion 141 and the projection portion 142. The first main body portion 141 is arranged coaxially within the main cylinder 11 at a location forward of the inner wall portion 111. The first main body portion 141 is formed in a substantially bottomed cylinder shape having an opening at a front portion thereof and a bottom wall 141a at a rear portion thereof. In other words, the first main body portion 141 includes the bottom wall 141a and a circumferential wall portion 141b.

The bottom wall 141a is provided inside the main cylinder 11 at a location forward of the inner wall portion 111 in a fluid-tight manner while allowing the bottom wall 141a to be slidably movable in the axial direction. The circumferential wall portion 141b is formed in a cylinder shape having a smaller diameter than the bottom wall 141a and extends coaxially from a front end surface of the bottom wall 141a in the forward direction. A front portion of the circumferential wall portion 141b is provided to be slidably movable in the axial direction relative to the small diameter portion 112 and in fluid-tightly therewith, while allowing the front portion of the circumferential wall portion 141b to be slidably movable in the axial direction relative to the small diameter portion 112. A rear portion of the circumferential wall portion 141b is spaced apart from the inner circumferential surface of the main cylinder 11.

The projection portion 142 is a column-shaped portion projecting rearward from a center of a rear end surface of the first main body portion 141. The projection portion 142 is provided so as to penetrate into the through hole 111a of the inner wall portion 111 and to be slidably movable in the axial direction. Additionally, an outer circumferential surface of the projection portion 142 and an inner circumferential surface of the through hole 111a are kept to be fluid-tight by a sealing member attached to the through hole 111a for contacting the entire outer circumferential surface of the projection portion 142. A rear portion of the projection portion 142 projects rearward from the through hole 111a to the inside of the cylinder portion 121. The rear portion of the projection portion 142 is spaced apart from an inner circumferential surface of the cylinder portion 121. A rear end surface of the projection portion 142 is spaced apart from the bottom wall 131 of the input piston 13 by a predetermined distance. The first master piston 14 is biased in the rearward direction by a biasing member 143 including, for example, a spring and the like.

A servo chamber (corresponding to the driving pressure chamber) 1A is defined by a rear end surface of the bottom wall 141a formed at the first main body portion 141, the front end surface of the inner wall portion 111, a portion of the inner circumferential surface of the main cylinder 11 located forward of the inner wall portion 111, and the outer circumferential surface of the projection portion 142. A first reaction force chamber 1B is defined by a rear end surface of the inner wall portion 111, an outer surface of the input piston 13, an inner circumferential surface of the front portion 121a formed at the cylinder portion 121, and an outer surface of the projection portion 142. A second reaction force pressure chamber 1C is defined by a rear end surface of the small diameter portion 112 (including a sealing member 91), an outer circumferential surface of the circumferential wall portion 141b, the front end surface of the bottom wall 141a, and the inner circumferential surface of the main cylinder 11.

The second master piston 15 is coaxially arranged within the main cylinder 11 at a location forward of the first master piston 14. The second master piston 15 is formed in a substantially bottomed cylinder shape having an opening at a front portion thereof and a bottom wall 151 at a rear portion thereof. More specifically, the second master piston 15 includes the bottom wall 151 formed in a column shape and a circumferential wall portion 152 projecting in the forward direction from the bottom wall 151. The bottom wall 151 is arranged between the small diameter portions 112, 113 at a location forward of the first master piston 14. The rear portion of the second master piston 15 including the bottom wall 151 is spaced apart from the inner circumferential surface of the main cylinder 11. The circumferential wall portion 152 is formed in a cylindrical shape and coaxially and extends forward from an outer edge of the bottom wall 151. The circumferential wall portion 152 is fluid-tightly provided slidably movable in the axial direction relative to the small diameter portion 113 and in fluid-tightly therewith, while allowing the circumferential wall portion 152 to be slidably movable within the small diameter portion 113 in the axial direction. The second master piston 15 is biased in the rearward direction by a biasing member 153 including, for example, a spring and the like.

A first master chamber 1D is defined by an outer surface of the second master piston 15, a front end surface of the first master piston 14, an inner surface of the first maser piston 14, a front end surface of the small diameter portion 112 (including a sealing member 92), a rear end surface of the small diameter portion 113 (including a sealing member 93), and the inner circumferential surface of the main cylinder 11 between the small diameter portions 112, 113 (the inner surface of the main cylinder 11 located forward of the inner wall portion 111). Furthermore, a second master chamber 1E is defined by a bottom surface 111d inside the main cylinder 11, a front end surface of the second master piston 15, an inner surface of the second master piston 15, a front end surface of the small diameter portion 113 (including a sealing member 94), and the inner circumferential surface of the main cylinder 11.

Ports 11*a* to 11*i*, which connect the inside and the outside, are formed at the master cylinder 1. The port 11*a* is formed at the main cylinder 11 at a location rearward of the inner wall portion 111. The port 11*b* is formed at the main cylinder 11 opposite to the port 11*a* at approximately the same location in the axial direction. The port 11*a* and the port 11*b* are in communication through a clearance formed between the inner circumferential surface of the main cylinder 11 and the outer circumferential surface of the cylinder portion 121. The port 11*a* is connected to a conduit 161. The port 11*b* is connected to a reservoir 171. In other words, the port 11*a* is in communication with the reservoir 171.

The port 11*b* is in communication with the first reaction force chamber 1B via a passage 18 formed at the cylinder portion 121 and the input piston 13. The passage 18 is divided when the input piston 13 moves forward. In other words, when the input piston 13 moves forward, the first reaction force chamber 1B and the reservoir 171 are disconnected from each other.

The port 11*c* is formed at a location forward of the port 11*a* and connects the first reaction force chamber 1B with a conduit 162. The port 11*d* is formed at a location forward of the port 11*c* and connects the servo chamber 1A with a conduit 163. The port 11*e* is formed at a location forward of the port 11*d* and connects the second reaction force pressure chamber 1C with a conduit 164.

The port 11*f* is formed between the sealing members 91, 92 of the small diameter portion 112 and connects a reservoir 172 with the inside of the main cylinder 11. The port 11*f* is in communication with the first master chamber 1D via a passage 144 formed at the first master piston 14. The passage 144 is formed at a location slightly rearward of the sealing member 92 so that the port 11*f* and the first master chamber 1D are disconnected from each other when the first master piston 14 moves forward.

The port 11*g* is formed at a location forward of the port 11*f* and connects the first master chamber 1D with a conduit 51. The port 11*h* is formed between the sealing members 93, 94 of the small diameter portion 113 and connects a reservoir 173 with the inside of the main cylinder 11. The port 11*g* is in communication with the second master chamber 1E via a passage 154 formed at the second master piston 15. The passage 154 is formed at a location slightly rearward of the sealing member 94 so that the port 11*g* and the second master chamber 1E are disconnected from each other when the second master piston 15 moves forward. The port 11*i* is formed at a location forward of the port 11*h* and connects the second master chamber 1E with a conduit 52.

A sealing member such as an O-ring and the like (see black dots in FIG. 1) are appropriately provided within the master cylinder 1. The sealing members 91, 92 are provided at the small diameter portion 112 and fluid-tightly contact the outer circumferential surface of the first master piston 14. Similarly, the sealing members 93, 94 are provided at the small diameter portion 113 and fluid-tightly contact the outer circumferential surface of the second master piston 15. Additionally, sealing members are provided between the input piston 13 and the cylinder portion 121.

The stroke sensor 72 detects an amount of operation (an amount of pressing) applied to the brake pedal 10 and transmits the detection result to the brake ECU 6.

(The Reaction Force Generating Device 2)

The reaction force generating device 2 includes a stroke simulator 21. The stroke simulator 21 generates a reaction force pressure at the first reaction force chamber 1B and the second reaction force pressure chamber 1C in response to the operation of the brake pedal 10 and duplicates normal operation feeling (pressing feeling) of the brake system. Generally, the stroke simulator 21 is configured in such a manner that a piston 212 is fitted into a cylinder 211 while being allowed to slidably move therein and a pilot fluid chamber 214 is formed at a location forward of the piston 212, which is biased in the forward direction by a compression spring 213. The stroke simulator 21 is connected to the second reaction force pressure chamber 1C via the conduit 164 and the port 11*e*, and is connected to the separation lock valve 22 and the reaction force valve 3 via the conduit 164.

(The Separation Lock Valve 22)

The separation lock valve 22 is a normally-closed-type electromagnetic valve and is configured so that opening and closing thereof is controlled by the brake ECU 6. The separation lock valve 22 is connected to the conduit 164 and the conduit 162, and is configured to connect/disconnect the conduit 162 with/from the conduit 164. The separation lock valve 22 is a valve for connecting/disconnecting the first reaction force chamber 1B with/from the second reaction force pressure chamber 1C. When the communication between the first and the second reaction force chambers 1B and 1C is interrupted by the separation lock valve 22, the first reaction force chamber 1B becomes in liquid-tight condition thereby to move the first master piston together with the input piston 13 (hereinafter, this condition is referred to as "under separation lock condition").

The pressure sensor 73 mainly detects pressure (the reaction force pressure) of the first reaction force chamber 1B and the second reaction force pressure chamber 1C. The pressure sensor 73 is connected to the conduit 164. The pressure sensor 73 detects the pressures of the first reaction force chamber 1B and the second reaction force pressure chamber 1C while the separation lock valve 22 is in an open state. On the other hand, while the separation lock valve 22 is in a closed state, the pressure sensor 73 detects the pressure at the second reaction force pressure chamber 1C.

(The Reaction Force Valve 3)

The reaction force valve 3 is a normally-open-type electromagnetic valve and is configured so that opening and closing thereof is controlled by the brake ECU 6. The reaction force valve 3 is connected to the conduit 164 and the conduit 161, and is configured to connect/disconnect the conduit 161 with/from the conduit 164. The reaction force valve 3 is a valve which connects/disconnects the first reaction force chamber 1B and the second reaction force pressure chamber 1C with/from the reservoir 171.

(The Servo Pressure Generating Device 4)

The servo pressure generating device 4 mainly includes a pressure decreasing valve 41 (which corresponds to a "pilot pressure generating portion" of the present invention), a pressure increasing valve 42 (which corresponds to the "high pressure power source" of the present invention), a pressure supplying portion 43 (which corresponds to the "high pressure source" of the present invention), and a regulator (which corresponds to the "mechanical type regulator") 44.

The pressure decreasing valve 41 is a normally-open-type electromagnetic valve and flow-rate therethrough is controlled by the brake ECU 6. One outlet/inlet of the pressure decreasing valve 41 is connected to the conduit 161 via a conduit 411, and the other outlet/inlet of the pressure decreasing valve 41 is connected to a conduit 413. More specifically, the one outlet/inlet of the pressure decreasing valve 41 is in communication with the reservoir 171 via the conduits 411, 161, and ports 11*a*, 11*b*. The pressure increasing valve 42 is a normally-closed-type electromagnetic valve and is configured so that an opening area thereof is linearly controlled by the brake ECU 6, thereby controlling the hydraulic pressure at the downstream passage of the pressure increasing valve 42. One outlet/inlet of the pressure increasing valve 42 is connected to a conduit 421, and the other outlet/inlet of the pressure increasing valve 42 is connected to a conduit 422.

The pressure supplying portion 43 is a means to supply the braking fluid at high pressure to the regulator 42 on the basis of a command from the brake ECU 6. The pressure supplying portion 43 mainly includes an accumulator 431, a hydraulic pressure pump 432, a motor 433, and a reservoir 434.

The accumulator 431 pressure accumulates the hydraulic pressure generated by the hydraulic pressure pump 432. The accumulator 431 is connected to the regulator 44, the pressure sensor 75 and the hydraulic pressure pump 432 via a conduit 431*a*. The hydraulic pressure pump 432 is connected to the motor 433 and the reservoir 434. The hydraulic pressure pump 432 supplies the braking fluid accumulated in the reservoir 434 to the accumulator 431 when the motor 433 is driven. The pressure sensor 75 (corresponding to the accumulator pressure detecting portion) detects the pressure in the accumulator 431 (corresponding to the accumulator pressure).

When the pressure sensor 75 detects that the accumulator pressure decreases to a predetermined value, the motor 433 is driven on the basis of a control signal from the brake ECU 6, and the hydraulic pressure pump 432 supplies the braking fluid to the accumulator 431 in order to supply pressure energy to the accumulator 431.

Figure 2:
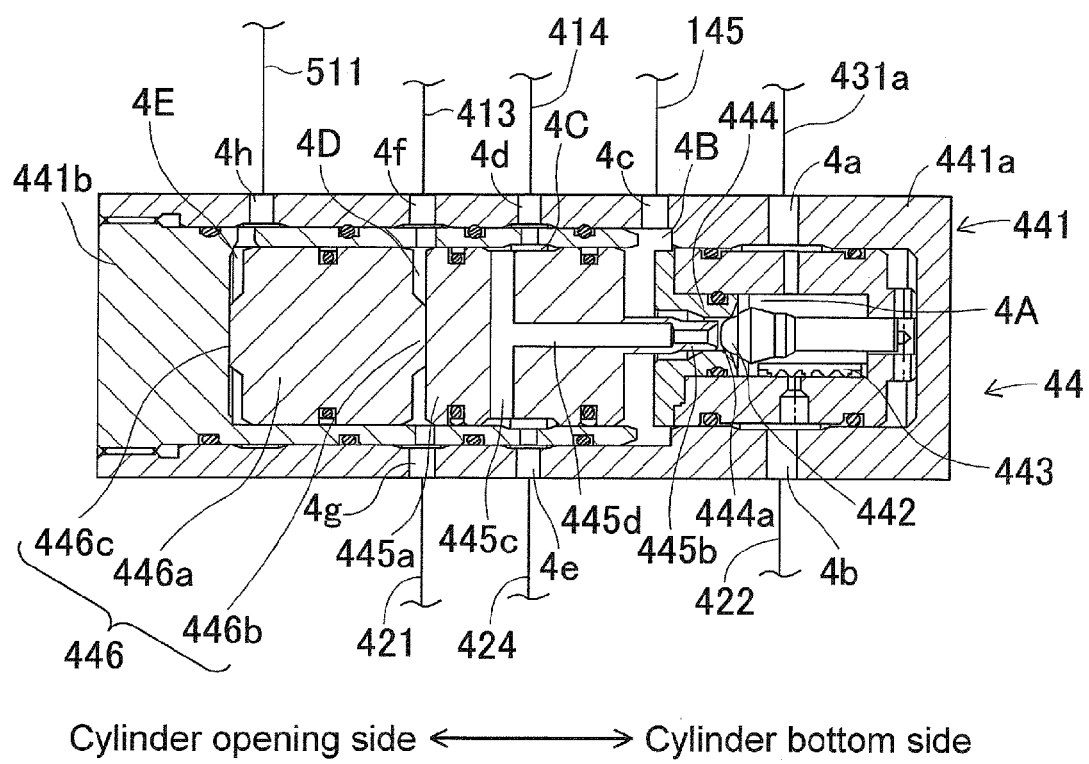
FIG. 2 is a cross sectional partial view illustrating a configuration of a regulator according to the embodiment.

As shown in FIG. 2, the regulator 44 is configured in such a manner that mainly a sub-piston 446 is added to a standard or normal regulator. More specifically, the regulator 44 mainly includes a cylinder 441, a ball valve 442, a biasing portion 443, a valve seat portion 444, a control piston 445 and the sub-piston 446.

The cylinder 441 includes a cylinder case 441*a* formed in a substantially bottomed cylinder-shape having a bottom surface at one end thereof (at the right side in FIG. 2), and a cover member 441*b* closing an opening of the cylinder case 441*a* (at the left side thereof in FIG. 2). The cover member (441*b*) is formed to be substantially U-shaped in cross-section in FIG. 2. However, the regulator 44 is explained here with the cover member 441*b* as a column-shaped member, and a portion that closes the opening of the cylinder case 441*a* as the cover member 441*b* in this embodiment. The cylinder case 441*a* is provided with plural ports 4*a* to 4*h* through which the inside and the outside of the cylinder case 441*a* are in communication.

The port 4*a* is connected to the conduit 431*a*. The port 4*b* is connected to the conduit 422. The port 4*c* is connected to the conduit 163. The port 4*d* is connected to the conduit 161 via the conduit 411. The port 4*e* is connected to a conduit 424, which is connected to the conduit 422 via a relief valve 423. The port 4*f* is connected to the conduit 413. The port 4*g* is connected to the conduit 421. The port 4*h* is connected to a conduit 511, which is diverged from the conduit 51.

The ball valve 442 is a valve having a ball shape at an end portion thereof. The ball valve 442 is provided within the cylinder 441 at a location closer to the bottom surface of the cylinder case 441*a* (which will be hereinafter referred to also as a cylinder bottom surface side). The biasing portion 443 is a spring member biasing the ball valve 442 towards the opening of the cylinder case 441*a* and is provided at the bottom surface of the cylinder case 441*a*. The valve seat portion 444 is a wall member provided at an inner peripheral surface of the cylinder case 441*a* and dividing the inside of the cylinder case into two portions, the cylinder opening side and the cylinder bottom side. A through passage 444*a* through which the divided cylinder opening side and the cylinder bottom surface side are in communication is formed at a center of the valve seat portion 444. The valve seat portion 444 supports the ball valve 442 from the cylinder opening side by closing the through passage 444*a* by the biased ball valve 442.

A space defined by the ball valve 442, the biasing portion 443, the valve seat portion 444, and a portion of the inner circumferential surface of the cylinder case 441*a* positioned closer to the cylinder base surface is referred to as a first chamber 4A. The first chamber 4A is filled with the braking fluid. The first chamber 4A is connected to the conduit 431*a* via the port 4*a* and to the conduit 422 via the port 4*b*.

The control piston 445 includes a main body portion 445*a* formed in a substantially column shape and a projection portion 445*b* formed in a substantially column shape having a smaller diameter than the main body portion 445*a*. The main body portion 445*a* is provided inside the cylinder 441 in a coaxial and fluid-tight manner relative to the cylinder opening side of the valve seat portion 444, while allowing the main body portion 445*a* to be slidably movable in the axial direction. The main body portion 445*a* is biased towards the cylinder opening by means of a biasing member, which is not illustrated in FIG. 2. A passage 445*c* is formed at a substantially intermediate portion of the main body portion 445*a* in the cylinder axial direction. The passage 445*c* extends in the radial direction (in an up-and-down direction in FIG. 2) so that both end portions thereof open at a circumferential surface of the main body portion 445*a*. A portion of an inner circumferential surface of the cylinder 441 corresponding to the location of the opening of the passage 445*c* is provided with the port 4*d* and is formed to recess so as to form a third chamber 4C together with the main body portion 445*a*.

The projection portion 445*b* projects towards the cylinder base surface from a center portion of an end surface of the main body portion 445*a* facing the cylinder base surface. The projection portion 445*b* is formed so that the diameter thereof is smaller than the diameter of the through passage 444*a* of the valve seat portion 444. The projection portion 445*b* is coaxially provided relative to the through passage 444*a*. An end portion of the projection portion 445*b* is spaced apart from the ball valve 442 towards the cylinder opening by a predetermined distance. A passage 445*d* is formed at the projection portion 445*b* so that the passage 445*d* extends in the cylinder axial direction and opens at a center portion of an end surface of the projection portion 445*b* facing the cylinder base surface. The passage 445*d* extends to the inside of the main body portion 445*a* and is connected to the passage 445*c*.

A space defined by the end surface of the main body portion 445*a* facing the cylinder bottom surface, an outer surface of the projection portion 445*b*, the inner circumferential surface of the cylinder 441, the valve seat portion 444, and the ball valve 442 is referred to as a second chamber 4B (which corresponds to a "servo pressure generating chamber" of the present invention). The second chamber 4B is in communication with the ports 4*d*, 4*e* via the passages 445*c*, 445*d*, and the third chamber 4C.

The sub-piston 446 includes a sub main body portion 446*a*, a first projection portion 446*b*, and a second projection portion 446*c*. The sub main body portion 446*a* is formed in a substantially column shape. The sub main body portion 446*a* is provided within the cylinder 441 in the coaxial and fluid-tight manner relative to the cylinder opening side of the main body portion 445*a* while allowing the sub main body portion 446*a* to be slidably movable in the axial direction.

The first projection portion 446*b* is formed in a substantially column shape having a smaller diameter than the sub main body portion 446*a* and projects from a center portion of an end surface of the sub main body portion 446*a* facing the cylinder base surface. The first projection portion 446b contacts an end surface of the main body portion 445a facing the cylinder opening. The second projection portion 446c is formed in the same shape as the first projection portion 446b. The second projection portion 446c projects from a center portion of an end surface of the sub main body portion 446a facing the cylinder opening. The second projection portion 446c contacts the cover member 441b.

A space defined by the end surface of the sub main body portion 446a facing the cylinder base surface, an outer surface of the first projection portion 446b, an end surface of the control piston 445 facing the cylinder opening, and the inner circumferential surface of the cylinder 441 is referred to as a pilot pressure chamber 4D. The pilot pressure chamber 4D is in communication with the pressure decreasing valve 41 via the port 4f and the conduit 413, and with the pressure increasing valve 42 via the port 4g and the conduit 421. A predetermined pilot pressure is generated in the pilot pressure chamber 4D by controlling the pressure decreasing and increasing valves 41 and 42. The servo pressure value becomes a hydraulic pressure level depending on the pilot pressure level based on the accumulator pressure by operating the regulator 44.

A space defined by the end surface of the sub main body portion 446a facing the cylinder opening, an outer surface of the second projection portion 446c, the cover member 441b, and the inner circumferential surface of the cylinder 441 is referred to as a fourth chamber 4E. The fourth chamber 4E is in communication with the port 11g via the port 4h and the conduits 511, 51. Each of the chambers 4A through 4E is filled with the braking fluid. The pressure sensor 74 (corresponding to the driving pressure detecting portion) is a sensor that detects the pressure (the servo pressure) of the servo chamber 1A, and is connected to the conduit 163.

(Braking Apparatus 5)

The first master chamber 1D and the second master chamber 1E, at which a master cylinder pressure is generated, are in communication with the wheel cylinders 541 through 544 via the conduits 51, 52, and the ABS 53. More specifically, the known ABS (the Antilock Brake System) 53 is connected to the port 11g of the first master chamber 1D and the port 11i of the second master chamber 1E via the conduits 51, 52, respectively. The ABS 53 is connected to the wheel cylinders 541 through 544, which activate the brake operation in the wheels 5FR through 5RL.

The ABS 53 is explained with a configuration of one of the four wheels (5FR) as an example, and explanation about other wheels will be omitted because all four wheels are configured the same. The ABS 53 includes an input valve 531, a pressure decreasing valve 532, a reservoir 533, a pump 534, and a motor 535. The input valve 531 (corresponding to the electro-magnetic valve) is a normally-open-type electromagnetic valve and is configured so that opening and closing thereof is controlled by the brake ECU 6. The input valve 531 is arranged so that one side is connected to the conduit 52 and the other side is connected to the wheel cylinder 541 and the pressure decreasing valve 532.

In more detail, the input valve 531 according to this embodiment is an electro-magnetic valve which passage interrupting force (for example, a biasing force to bias the valve member towards the master cylinder side relative to the opening) varies in response to the electric power to be supplied thereto. Larger the supplied electric power, larger the force which interrupts the flow passage becomes. When the force applied to the wheel cylinder 541 through 544 side from the master cylinder 1 side (i.e. the pressure difference between the master cylinder 1 side and the wheel cylinder 541 through 544 side) exceeds the passage interrupting force, the input valve 531 opens. Thus, the input valve 531 has the operating characteristics which is the relationship regarding to the pressure difference between the master cylinder 1 side and the wheel cylinder 541 through 544 side (IP characteristics) and controls the flow of the braking fluid between the master cylinder 1 side and the wheel cylinder 541 through 544 side in response to the supplied electric power. A one-way valve "z" is provided in the input valve 531 in the opposite direction with respect to the opening direction of the input valve 531.

Figure 3:
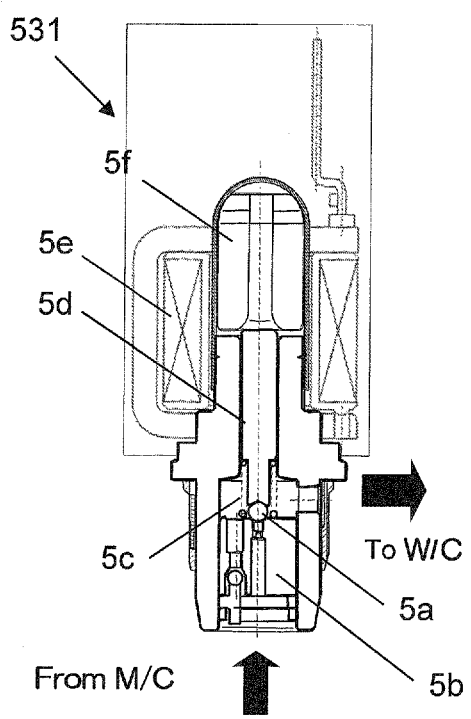
FIG. 3 is a conceptual view for explaining the input valve.

The input valve 531 will be explained conceptually hereinafter. As shown in FIG. 3, the input valve includes a valve member 5a, a valve seat member 5b, a spring 5c, a movable iron core 5d, a solenoid 5e and a fixed iron core 5f. The valve member 5a is connected to a tip end of the movable iron core 5d and is functioned to close/open a through-hole formed in the valve seat 5b. The valve seat 5b is formed with the through-hole which establishes fluid communication between the master cylinder 1 side (lower side in FIG. 3) and the wheel cylinder 541 side (right side in FIG. 3) in the conduit 52. The spring 5c is disposed between the valve seat member 5b and the movable iron core 5d and is always biasing the movable iron core 5d in a direction that the movable iron core 5d is separated from the valve seat member 5b. The movable iron core 5d is driven upon energization of the solenoid 5e to move the valve member 5a towards the valve seat member 5b. The solenoid 5e generates an electro-magnetic force in response to the supplied electricity and applies the force to the movable iron core 5d in a direction that the movable iron core 5d pushes the valve seat member 5b. The solenoid 5e drives the movable iron core 5d and the valve member 5a towards the valve seat member 5b side. The fixed iron core 5f is disposed in a rear side (upper side in FIG. 3) of the movable iron core 5d. When the electricity supplied to the input valve 531 (i.e., solenoid 5e) increase, the pushing force of the movable iron core 5d pushing the valve member 5a onto the valve seat member 5b becomes large and on the other hand, when the electricity supplied to the solenoid 5e increase, the pushing force of the movable iron core 5d pushing the valve member 5a onto the valve seat member 5b becomes small. Accordingly, if the amount of electricity supplied to the solenoid 5e is decreased gradually, the electro-magnetic force which biases the movable iron core 5d yields to the pressure difference (differential pressure) as explained above and the biasing force of the spring 5c at certain timing and then the valve member 5a is forced to be separated from the valve seat member 5b by the biasing force of the spring 5c. In other words, when the supplied electricity decreases gradually, the input valve 531 is opened at the certain timing by the differential pressure. The amount of electricity at this certain timing is the amount of valve opening electricity. When the input valve 531 opens, the braking fluid flows from the high pressure master cylinder 1 side to the wheel cylinder 541 through 544 side. The master pressure decrease accordingly and the master pistons 14 and 15 advance by the generated servo pressure.

The pressure decreasing valve 532 is a normal close type electro-magnetic valve and the opening/closing operation is controlled by the brake ECU 6. The pressure decreasing valve 532 is connected to the wheel cylinder 541 and the input valve 531 at one side and is connected to the reservoir 533 at the other side. When the pressure decreasing valve 532 is opened, fluid communication between the wheel cylinder 541 and the reservoir 533 is established.

The reservoir 533 stores the braking fluid and is connected to the conduit 52 via the pressure decreasing valve 532 and the pump 534. The pump 534 is connected to the reservoir 533 at the suction port and the discharge port is connected to the conduit 52 via the one-way valve "z". It is noted here that the one-way valve "z" allows the flow from the pump 534 to the conduit 52 (the second master chamber 1E) but restricts the flow in opposite direction. The pump 534 is driven by the motor 535 which is actuated by a command from the brake ECU 6. The pump 534 suctions the braking fluid stored in the reservoir 533 or in the wheel cylinder 541 and returns the fluid to the second master chamber 1E under the pressure decreasing mode of the ABS control. It is noted that a damper (not shown) is provided in the upper stream side of the pump 534 to dampen the pulsation of the braking fluid discharged by the pump 534.

The ABS 53 includes a wheel speed sensor (not illustrated) that detects a wheel speed. The wheel speed sensor is configured so that a detection signal indicative of the wheel speed detected by the wheel speed sensor is outputted to the brake ECU 6.

According to the ABS 53 having the above-described configuration, the brake ECU 6 controls switching of the opening/closing of each of the electromagnetic valves 531, 532 on the basis of the master cylinder pressure, the state of the wheel speed, and a vertical acceleration, and activates the motor 535 if necessary in order to execute the ABS control (the Antilock Brake Control) that adjusts the brake hydraulic pressure applied to the wheel cylinder 541, i.e. the braking force applied to the wheel 5FR. The ABS 53 is a device that adjusts the amount, the timing and the like of the braking fluid supplied from the master cylinder 1 on the basis of the command from the brake ECU 6 and supplies the adjusted braking fluid to the wheel cylinders 5FR through 5RL.

In a "linear mode", which will be explained in detail below, the hydraulic pressure transmitted from the accumulator 431 of the servo pressure generating device 4 is controlled by the pressure increasing valve 42 and the pressure decreasing valve 41, and the servo pressure is generated at the servo chamber 1A, thereby the first master piston 14 and the second master piston 15 move forward and the first master chamber 1D and the second master chamber 1E are pressurized. The hydraulic pressures at the first master chamber 1D and the second master chamber 1E are applied to the wheel cylinders 541 through 544 as the master cylinder pressure from the ports 11g, 11i via the conduits 51, 52 and the ABS 53, and a hydraulic pressure braking force is applied to the wheels 5FR through 5RL.

(The Brake ECU 6)

The brake ECU 6 is an electronic control unit and communicates with various sensors (for example, such as sensors 72 through 75). The brake ECU 6 controls the electro-magnetic valves 22, 3, 41, 42, 531 and 532 and motors 433 and 535. The brake ECU 6 memorizes two control modes, the "linear mode" and a "REG (regulator) mode". The "linear mode" is a normal brake control. More specifically, the linear mode is a mode to control the "servo pressure" of the servo chamber 1A in such a manner that the pressure decreasing valve 41 and the pressure increasing valve 42 are controlled while the separation lock valve 22 is opened and the reaction force valve 3 is closed. The "REG mode" is a mode to turn the pressure decreasing valve 41, the pressure increasing valve 42, the separation lock valve 22 and the reaction force valve 3 to be in a non-energized state, or a mode to be executed in a case that the pressure decreasing valve 41, the pressure increasing valve 42, the separation lock valve 22 and the reaction force valve 3 are turned to be in the non-energized state (maintaining a normal state) because of a failure and the like.

(Braking Operation)

The braking operation will be explained hereinafter. When the brake pedal 10 is depressed, the input piston 13 advances to close the passage 18 to thereby interrupt the fluid communication between the reservoir 171 and the first reaction force chamber 1B.

In the linear mode, the reaction force valve 3 is controlled to be closed and the separation lock valve 22 is controlled to be open. Therefore, the two reaction force chambers 1B and 1C are mutually in fluid communication state, but are hydraulically interrupted from the reservoir 171. The stroke simulator 21 is operated to generate reaction force pressure in the reaction force chambers 1B and 1C in response to the stroke amount. Even the reaction force pressure is generated in the first and the second reaction force chambers 1B and 1C, such pressure acts on both the rear end surface (rearward end surface of the projection portion 142) and front end surface (frontward end surface of the bottom wall 141a) of the first master piston 14, the master piston is driven by the servo pressure.

On the other hand, in the REG mode, the reaction force valve 3 is controlled to be open and the separation lock valve 22 is controlled to be closed. Therefore, the first reaction force chamber 1B becomes liquid-tight state and the second reaction force chamber 1C is in communication with the reservoir 171. Therefore, the first master piston 14 is driven in response to the operating force (depression force) of the brake pedal 10.

(Operating Characteristics Setting Control)

Figure 4:
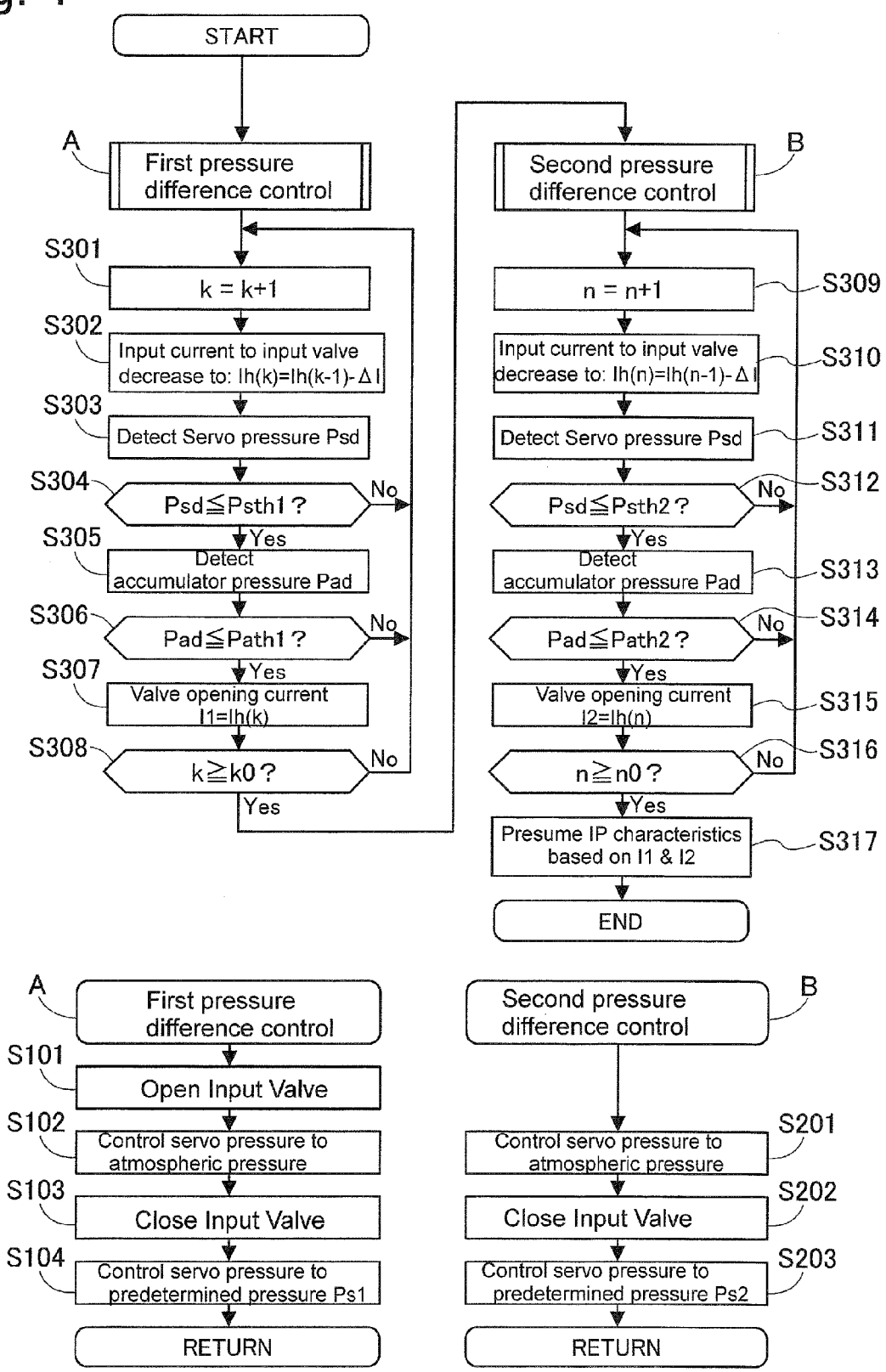
FIG. 4 is a flowchart for controlling of the setting of the operating characteristics according to the embodiment.

Hereinafter, the control for setting the operating characteristics of the input valve 531 by the brake ECU 6 will be explained. According to this embodiment of the invention, the operating characteristics are presumed and set by obtaining respective valve opening electric currents in two different pressure differentials. As shown in FIG. 4, the pressure difference between the master cylinder 1 side and the wheel cylinder 541 through 544 side can be controlled to be the value of $\Delta P1$ with respect to the input valve 531 as the boundary (First pressure differential control: A). The valve opening electric current is said to be the maximum supply current that the input valve 531 opens by the pressure difference, or the minimum supply current that the input valve 531 is closed by the pressure difference.

In the first pressure difference control (A), the brake ECU 6 opens the input valve 531 (step S101), then the brake ECU 6 controls the pressure decreasing valve 41 (532) and the pressure increasing valve 42, thereby to control the level of the servo pressure to be the atmospheric pressure (step S102). Then, the brake ECU 6 gives command to the electric power supply means (not shown) to supply the input valve 531 with electric power (input electricity). Thus, the input valve 531 is closed (step S103). The amount of the input electricity at this time is set to be the level sufficient to keep the input valve 531 not to be opened, overcoming the differential pressure $\Delta P1$. It is noted here that in this description, the "input electricity" means either one of "electricity to be inputted", "electric current to be inputted under a constant voltage" and "electric voltage to be inputted under a constant current". In other words, the "input electricity" is used to include the "value of electric power to be inputted". According to this embodiment, the brake ECU 6 obtains the valve opening current I1 of the input valve 531 against the predetermined differential pressure $\Delta P1$ by increasing or decreasing the electric current value (input electricity) to the input valve 531.

Next, the brake ECU 6 controls the pressure decreasing valve 41 and the pressure increasing valve 42 to control the level of the servo pressure to a predetermined pressure Ps1 level (step S104). Then the master pistons 14 and 15 are driven to increase the master pressure thereby to generate a desired differential pressure ΔP1. When the ratio of pressure between the servo pressure and the master pressure is 1:1, the brake ECU 6 controls the servo pressure (predetermined pressure Ps1) to the desired differential pressure ΔP1 (Ps1=ΔP1).

In order to decrease the input current in stages, the brake ECU 6 counts the number of decreasing steps (plug "k+1" into "k") at the step S301. Then the brake ECU 6 decreases the input current Ih (k) into the input valve 531 by the value ΔI (Ih (k)=Ih (k−1)−ΔI) at the step S302. Thus, the brake ECU 6 decreases the input current and at the same time detects the value of the servo pressure Psd, using the pressure sensor 74 (step S303). Then the brake ECU judges whether the servo pressure Psd is equal to or less than the value of the predetermined threshold servo pressure Psth1 or not at the step S304. If the value Psd is larger than the value Psth1 ("No" at the step S304), the brake ECU 6 increases the count at the step S301.

If the value Psd is equal to or less than the value Psth1 ("Yes" at the step S304), the brake ECU 6 detects the accumulator pressure Pad using the pressure sensor 75 at the step S305. Then the brake ECU 6 judges whether the accumulator pressure Pad is equal to or less than the value of the predetermined threshold accumulator pressure Path1 or not at the step S306. If the value Pad is larger than the value Path1 ("No" at the step S306), the process returns to the step S301. If the value Pad is equal to or less than the value Path1 ("Yes" at the step S306), the brake ECU 6 memorizes the input current value Ih (k) as the valve opening current I1 relative to the differential pressure ΔP1 at the step S307. If the value "k" is less than "k0" ("No" at the step S308), then the process returns to the step S301 and if the vale "k" is equal to or more than the value "k0" ("Yes" at the step S308), the second pressure difference control (B) is executed to agree the pressure difference value with the value ΔP2. It is noted that the value "k0" is the number of times needed to have the input current to be zero (0). Therefore, the input current for the input valve 531 becomes zero when the value "k" is equal to or more than the value "k0".

Figure 5:
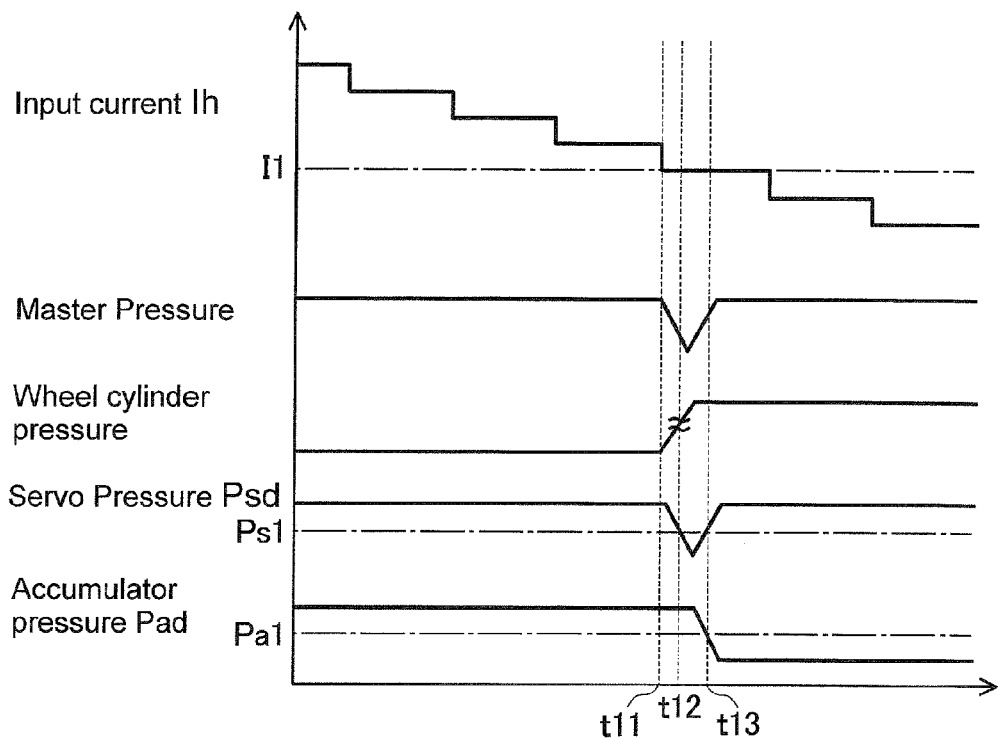
FIG. 5 is a time chart around the timing for valve opening operation of the input valve according to the embodiment.

The timing of obtaining the valve opening current I1 will be explained hereinafter with reference to the time chart in FIG. 5. As shown in FIG. 5, the input current Ih decreases in stages and when the input current Ih decreased to reach the value I1 (at the time "t11"), the wheel cylinder pressure starts to increase and at the same time the master pressure starts to decrease. This is because the input valve 531 has opened and the braking fluid flows into the low pressure side wheel cylinders 541 through 544 from the high pressure side master chambers 1D and 1E. with this temporal pressure drop of the master pressure, the master pistons 14 and 15 advance forward and the servo pressure Psd also drops temporarily at approximately the same time (or in somewhat delayed fashion) with the temporal drop of the master pressure. If such pressure change is caused by the opening of the input valve 531, the servo pressure Psd decreases until the value reaches to "Psth1" or less at the time "t12".

When the servo pressure drops, the brake ECU 6 controls the pressure decreasing vale 41 and pressure increasing valve 42 to increase the pilot pressure so that the servo pressure can maintain the original pressure value. As a result, the braking fluid flows into the second chamber 4B from the accumulator 431 via the conduit 431a and the port 4b. Thus, the accumulator pressure Pad also drops after the temporal drop of the servo pressure Psd. If such pressure change is caused by the opening of the input valve 531, the accumulator pressure Pad decreases until the value reaches to "Path1" or less at the time "t13".

Thus, whether the input valve 531 is open or not can be judged if the accumulator pressure Pad drops to the threshold value Path1 or less. However, if whether the servo pressure Psd drops equal to or less than the threshold value Psth1 can be detected prior to such judgment, more accurate valve opening judgment can be achieved. When the operating characteristics is determined based on the accumulator pressure Pad detection only, once the valve opening current I1 against the differential pressure ΔP1 memorized at the step S306 is set, such memorized value cannot be overwritten at the later current drop process ("No" at the step S308). According to the embodiment of this invention, a pressure sensor which directly measures the pressure at upper and lower stream sides of the input valve 531 can be omitted from the device and the setting of the operating characteristics of the input valve 531 can be achieved by using the existing pressure sensors 75 (and 74).

As shown in FIG. 4, in the second pressure difference control (B), the brake ECU 6 controls the pressure decreasing valve 41 and the pressure increasing valve 42 so that the servo pressure becomes equal to the atmospheric pressure (at the step S201). Then, the brake ECU 6 controls the electric power supply means to supply the input valve 531 with a predetermined electric current thereby to close the input valve 531 (at the step S202). Further, the brake ECU 6 controls the servo pressure to be a predetermined pressure Ps2 to generate the differential pressure ΔP2 (at the step S203).

Thereafter, the brake ECU 6 performs the same processes as the steps S301 through S308 as in the first pressure differential control (A). In detail, the brake the brake ECU 6 counts the number "n" of current decreasing steps at the step S309. Then the brake ECU 6 decreases the input current Ih (n) into the input valve 531 by the value ΔI (Ih (n)=Ih (n−1)−ΔI) at the step S310. Thus, the brake ECU 6 detects the value of the servo pressure Psd, using the pressure sensor 74 (step S311). Then the brake ECU compares the detected servo pressure Psd with a threshold value Psth2 and if the brake ECU judges the servo pressure Psd is larger than the predetermined threshold servo pressure ("No" at the step S312), then the process returns to the step S309 and if the ECU 6 judges that the servo pressure Psd is equal to or less than the value of the predetermined threshold servo pressure Psth2 ("Yes" at the step S312), the brake ECU 6 detects the accumulator pressure "Pad" by the pressure sensor 75 (at the step S313). Then the brake ECU 6 compares the detected accumulator pressure Pad with a threshold accumulator pressure Path2 (at the step S314) and judges whether the accumulator pressure Pad is larger than the value Path2 or not and if the accumulator pressure Pad is larger than the threshold value Path2 ("No" at the step S314), the process returns to the step S309 and if the accumulator pressure Pad is equal to or less than the threshold value Path2 ("Yes" at the step S314), the brake ECU 6 memorizes the input current Ih (n) as the valve opening current I2 against the differential pressure ΔP2 (at the step S315). Then the brake ECU 6 decreases the input current to the value zero (at the step S316).

As explained, the brake ECU 6 obtains the valve opening current I1 against the differential pressure ΔP1 and the valve opening current I2 against the differential pressure ΔP2. The brake ECU 6 presumes the operating characteristics of the input valve 531 based on the obtained two results (P1, I1) and (P2, I2). Thus the presumed operating characteristics are memorized and set as the operating characteristics of the input valve 531 (at the step S317). The brake ECU 6 functions as the operating characteristics setting means for setting the characteristics of the input valve 531 in addition to the brake control function.

According to the embodiment of the invention, the operating characteristics of the input valve 531 can be set by using the existing pressure sensor. Accordingly, a new sensor may not be provided in the vicinity of the input valve 531 and manufacturing cost can be reduced. It is noted that each threshold value (threshold pressure) is set for each differential pressure.

Figure 6:
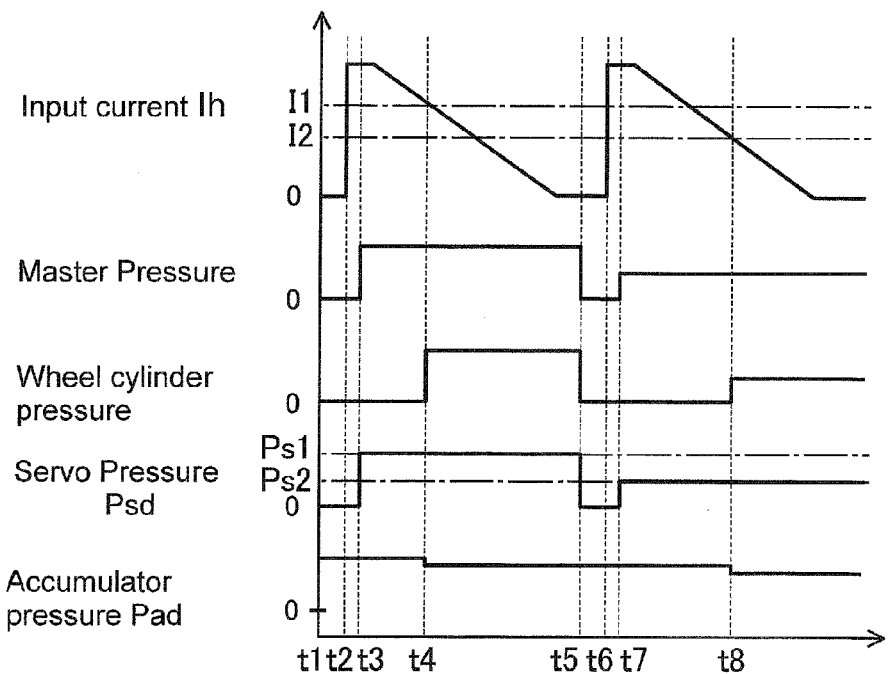
FIG. 6 is a time chart for controlling of setting of the operating characteristics according to the embodiment.

FIG. 6 shows a timing chart indicating the operating characteristics setting control as a whole. FIG. 5 shows a timing chart indicating the relationship of the various pressure values at the time around t4 of FIG. 6. As shown in FIG. 6, at the time t1, the input valve 531 is in open state and the servo pressure Psd indicates the atmospheric pressure level. At the time t2, the predetermined input current is supplied to the input valve 531 and the input valve 531 is closed. At the time t3, the servo pressure Psd is controlled to be the predetermined pressure value Ps1 and at the time t4, the servo pressure Psd drops to the threshold value Psth1 or less temporarily (See FIG. 5). The wheel cylinder pressure is then increased. At the time t5, the servo pressure Psd is again controlled to be the atmospheric pressure level and at the time t6, the input current is again supplied to the input valve 531 and the valve 531 is closed. At the time t7, the servo pressure Psd is controlled to be the predetermined pressure level Ps2. At the time t8, the servo pressure Psd is temporarily dropped to equal to or less than the threshold pressure value Psth2 (See FIG. 5) and the wheel cylinder pressure is increased.

According to the embodiment of the invention, the brake ECU 6 controls the pressure supply portion 43 to increase the accumulator pressure Pad (to the pressure which is somewhat larger than the accumulator pressure at the time t1) and after certain time elapsed, the operating characteristics setting control starts. The temperature of the accumulator 431 became high due to the influence from the motor 433 immediately after the pressure accumulation but when the temperature drops after a certain time period elapsed, the volume in the accumulator 431 changes to thereby generating decrease of accumulator pressure (This is called as "polytropic" change). Accordingly, the operating characteristics setting may start after the certain time period elapsed in order to accurately set the characteristics. The certain time period is defined to be the time period from the pressure increase of the accumulator pressure to a predetermined value to the time the accumulator pressure being stabilized to be constant value.

Figure 7:
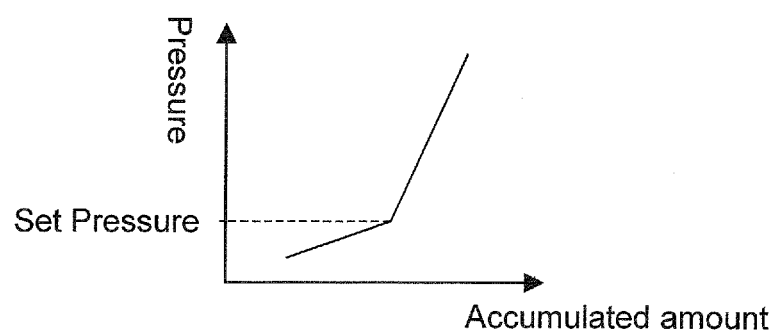
FIG. 7 is an explanatory view for explaining the characteristics of the accumulator.

Further, according to the embodiment of the invention, before the start of the operating characteristics setting control, the accumulator pressure is increased to a pressure higher than the predetermined set pressure value to stabilize the accumulator pressure with such high pressure level. As shown in FIG. 7, according to the set pressure, the change amount of the accumulator pressure relative to the accumulated flow amount (braking fluid flow rate) becomes large in the area where the pressure is higher than the set pressure. By utilizing the characteristics of the accumulator 431, only a small amount of accumulated amount can largely change the accumulator pressure. Thus, the change of accumulated amount can be accurately detected. It is noted that the set pressure and the polytropic change can be obtained by an experimental work. The operating characteristics setting control is performed before shipping of the vehicles or at the time of inspection of the vehicles. According to this embodiment of the invention, even when the operating characteristics had been changed due to the age related deteriorations, the control can be properly performed.

Modified Embodiment

The invention is not limited to the embodiment explained above and for example, in FIG. 4, instead of processing the steps S102 and S201, the brake ECU 6 may control the servo pressure to a predetermined value instead of setting to the atmospheric pressure. In other words, at the step S102, the brake ECU 6 controls the servo pressure to a predetermined pressure level Pw1 and at the step S104, when the ratio of the master pressure relative to the servo pressure is 1:1, the predetermined pressure Ps1 to be controlled is represented as Ps1=Pw1+ΔP1. Similarly, at the step S201, the brake ECU 6 controls the servo pressure to be the predetermined pressure level Pw2. In such modification, the similar result of the invention can be obtained.

The differential pressure to be measured may be one time, but if two or more different differential pressures are measured, more accurate operating characteristics can be obtained by obtaining two or more respective valve opening currents. Further, as an alternative, only one pressure sensor 75 (accumulator pressure) may be used without using another pressure sensor 74 (servo pressure). The present invention is not limited to the braking device for a vehicle having two reaction force chambers 1B and 1C but the invention includes the braking device having only one reaction force chamber 1B or 1C.

EXPLANATION OF REFERENCE NUMERALS

1; master cylinder, 11; main cylinder, 12; cover cylinder, 13; input piston, 14; first master piston, 15; second master piston, 1A; servo chamber (driving pressure chamber), 1B; first reaction chamber, 1C; second reaction force chamber, 1D; first master chamber, 1E; second master chamber, 2; reaction force generating device, 22; separation lock valve, 3; reaction force valve, 4; servo pressure generating device (hydraulic pressure generating device), 41; pressure decreasing valve, 42; pressure increasing valve, 43; pressure supply portion (high pressure source), 431; accumulator, 432; pump, 5; braking apparatus, 51a, 52a; change over valve, 531; input valve (electro-magnetic valve), 541, 542, 543 and 544; wheel cylinders, 5FR, 5FL, 5RR and 5RL; wheels, 6; brake ECU (operating characteristics setting means), 74; pressure sensor (drive pressure detecting portion), 75; pressure sensor (accumulator pressure detecting portion).

The invention claimed is:
1. A braking device for a vehicle comprising:
a hydraulic pressure generating device which generates a master pressure in a master chamber by driving a master piston by a driving pressure in a driving chamber, a wheel cylinder connected to the master chamber and an electro-magnetic valve for controlling a brake fluid flow between the hydraulic pressure generating device and the wheel cylinder in response to an input electric power, wherein the braking device further includes:
a high pressure source formed by a pump and an accumulator for accumulating the brake fluid discharged from the pump,
a pilot pressure generating portion for generating a desired pilot pressure,
a mechanical regulator connected to the accumulator, the pilot pressure generating portion and the driving chamber for generating a hydraulic pressure in the driving chamber in response to the pilot pressure based on an accumulator pressure in the accumulator,
an accumulator pressure detecting portion for detecting the accumulator pressure and
an operating characteristics setting means for setting an operating characteristic which is a relationship between the input electric power to the electro-magnetic valve and a pressure difference between a master cylinder side and a wheel cylinder side with respect to the electro-magnetic valve, based on the input electric power at the time when the accumulator pressure detected by the accumulator pressure detecting portion first falls to a value equal to or less than a threshold value accumulator pressure by changing the input electric power towards an opening side of the electro-magnetic valve in response to a time lapsed after a predetermined value of the pilot pressure has been generated by the pilot pressure generating portion by first closing the electro-magnetic valve.

2. The braking device according to claim 1, further including:
a driving pressure detecting portion for detecting the driving pressure in the driving chamber, wherein the operating characteristics setting means sets the operating characteristic based on the input electric power at the time when the accumulator pressure first falls to equal to or less than the threshold value accumulator pressure after the driving pressure in the driving chamber detected by the driving pressure detecting portion falls to equal to or less than a predetermined threshold driving pressure.

3. The braking device according to claim 1, wherein the operating characteristics setting means initiates setting of the operating characteristic of the electro-magnetic valve after the accumulator pressure has been set to be equal to or more than a predetermined accumulator setting pressure by controlling the high pressure source.

4. The braking device according to claim 1, wherein the operating characteristics setting means initiates setting of the operating characteristic of the electro-magnetic valve after a predetermined time passed after the accumulator pressure had been increased by controlling the high pressure source.

* * * * *